United States Patent
Harris et al.

(10) Patent No.: US 9,501,233 B2
(45) Date of Patent: *Nov. 22, 2016

(54) PROVIDING SNAPSHOTS OF VIRTUAL STORAGE DEVICES

(71) Applicant: Google Inc., Mountain View, CA (US)

(72) Inventors: Matthew S. Harris, Kirkland, WA (US); Andrew Kadatch, Redmond, WA (US);
(Continued)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/977,055

(22) Filed: Dec. 21, 2015

(65) Prior Publication Data

US 2016/0124669 A1    May 5, 2016

Related U.S. Application Data

(63) Continuation of application No. 14/629,149, filed on Feb. 23, 2015, now Pat. No. 9,251,234, which is a
(Continued)

(51) Int. Cl.
*G06F 13/00* (2006.01)
*G06F 3/06* (2006.01)
(Continued)

(52) U.S. Cl.
CPC .............. *G06F 3/0619* (2013.01); *G06F 3/065* (2013.01); *G06F 3/0664* (2013.01);
(Continued)

(58) Field of Classification Search
CPC .............. G06F 11/2069; G06F 11/2071; G06F 11/2087; G06F 17/30233; G06F 3/067;
(Continued)

(56) References Cited

U.S. PATENT DOCUMENTS

| 5,463,768 A | 10/1995 | Cuddihy et al. |
| 5,655,081 A | 8/1997 | Bonnell et al. |

(Continued)

FOREIGN PATENT DOCUMENTS

WO    2011/095516    8/2011

OTHER PUBLICATIONS

Moller, Jan, et al., "Internal Network Security", Feb. 1, 2000-May 18, 2001, Retrieved from the Internet: <URL: http://www.daimi.au.dk/~fwiffo/thesis/>, 183 pages.
(Continued)

*Primary Examiner* — Yong Choe
(74) *Attorney, Agent, or Firm* — Fish & Richardson P.C.

(57) ABSTRACT

In general, one aspect of the subject matter described in this specification can be embodied in methods that include receiving, at a computer system, a request to create a snapshot of a virtual storage device, wherein the virtual storage device virtually stores data at virtual addresses, the data being physically stored at a plurality of physical storage locations that are managed by an underlying storage system associated with virtual storage device. The methods can further include identifying, by the computer system, one or more regions of the virtual storage device that have been written to since a previous snapshot of the virtual storage device was created. The methods can additionally include generating a unique identifier for the requested snapshot; and creating the requested snapshot using the identified one more regions and the unique identifier.

15 Claims, 5 Drawing Sheets

(72) Inventors: Sergey Khorun, Seattle, WA (US); Carl Hamilton, Woodinville, WA (US)

Related U.S. Application Data continuation of application No. 13/602,974, filed on Sep. 4, 2012, now Pat. No. 8,966,198.

(60) Provisional application No. 61/530,358, filed on Sep. 1, 2011.

(51) Int. Cl.
*G06F 11/14* (2006.01)
*G06F 17/30* (2006.01)

(52) U.S. Cl.
CPC ......... *G06F 3/0673* (2013.01); *G06F 11/1451* (2013.01); *G06F 17/30312* (2013.01); *G06F 17/30575* (2013.01); *G06F 11/1469* (2013.01); *G06F 2201/815* (2013.01); *G06F 2201/84* (2013.01)

(58) Field of Classification Search
CPC .............. G06F 11/1451; G06F 11/2074; G06F 12/0862; G06F 17/30132; G06F 17/30153; G06F 17/30203; G06F 2201/84; G06F 2212/6024
See application file for complete search history.

(56) References Cited

U.S. PATENT DOCUMENTS

| | | |
|---|---|---|
| 5,778,444 A | 7/1998 | Langan et al. |
| 5,794,224 A | 8/1998 | Yufik |
| 6,148,368 A | 11/2000 | DeKoning |
| 6,178,482 B1 | 1/2001 | Sollars |
| 6,449,671 B1 | 9/2002 | Patkar et al. |
| 6,490,651 B1 | 12/2002 | Shats |
| 6,505,211 B1 | 1/2003 | Dessloch et al. |
| 6,505,248 B1 | 1/2003 | Casper et al. |
| 6,587,866 B1 | 7/2003 | Modi et al. |
| 6,598,179 B1 | 7/2003 | Chirashnya et al. |
| 6,643,613 B2 | 11/2003 | McGee et al. |
| 6,829,678 B1 | 12/2004 | Sawdon et al. |
| 6,891,839 B2 | 5/2005 | Albert et al. |
| 6,898,697 B1 | 5/2005 | Gao et al. |
| 6,996,502 B2 | 2/2006 | De La Cruz et al. |
| 7,043,455 B1 | 5/2006 | Cuomo et al. |
| 7,062,718 B2 | 6/2006 | Kodosky et al. |
| 7,117,243 B2 | 10/2006 | Peart |
| 7,356,679 B1 | 4/2008 | Le et al. |
| 7,466,703 B1 | 12/2008 | Arunachalam et al. |
| 7,478,388 B1 | 1/2009 | Chen et al. |
| 7,500,262 B1 | 3/2009 | Sanin et al. |
| 7,529,836 B1 | 5/2009 | Bolen |
| 7,584,467 B2 | 9/2009 | Wickham et al. |
| 7,596,620 B1 | 9/2009 | Colton et al. |
| 7,650,331 B1 | 1/2010 | Dean et al. |
| 7,653,833 B1 | 1/2010 | Miller et al. |
| 7,761,573 B2 | 7/2010 | Travostino et al. |
| 7,804,862 B1 | 9/2010 | Olson et al. |
| 7,836,285 B2 | 11/2010 | Giri et al. |
| 8,051,414 B2 | 11/2011 | Stender et al. |
| 8,065,717 B2 | 11/2011 | Band |
| 8,103,771 B2 | 1/2012 | Tanaka et al. |
| 8,108,903 B2 | 1/2012 | Norefors et al. |
| 8,127,295 B1 | 2/2012 | Jones et al. |
| 8,146,147 B2 | 3/2012 | Litvin et al. |
| 8,219,777 B2 | 7/2012 | Jacobson et al. |
| 8,261,295 B1 | 9/2012 | Risbood et al. |
| 8,276,140 B1 | 9/2012 | Beda et al. |
| 8,296,459 B1 | 10/2012 | Brandwine et al. |
| 8,407,687 B2 | 3/2013 | Moshir et al. |
| 8,423,993 B2 | 4/2013 | Faus et al. |
| 8,468,535 B1 | 6/2013 | Keagy et al. |
| 8,484,353 B1 | 7/2013 | Johnson et al. |
| 8,504,844 B2 | 8/2013 | Browning |
| 8,533,796 B1 | 9/2013 | Shenoy et al. |
| 8,745,329 B2 | 6/2014 | Kadatch et al. |
| 2002/0091902 A1 | 7/2002 | Hirofuji |
| 2002/0097747 A1 | 7/2002 | Kirkby |
| 2004/0068637 A1 | 4/2004 | Nelson et al. |
| 2004/0139368 A1 | 7/2004 | Austen et al. |
| 2004/0148484 A1 | 7/2004 | Watanabe et al. |
| 2004/0210653 A1 | 10/2004 | Kanoor et al. |
| 2005/0010715 A1 | 1/2005 | Davies et al. |
| 2005/0166011 A1 | 7/2005 | Burnett et al. |
| 2005/0196030 A1 | 9/2005 | Schofield et al. |
| 2005/0216659 A1 | 9/2005 | Ogawa et al. |
| 2005/0237543 A1 | 10/2005 | Kikuchi |
| 2005/0289499 A1 | 12/2005 | Ogawa et al. |
| 2006/0026354 A1 | 2/2006 | Lesot et al. |
| 2006/0048077 A1 | 3/2006 | Boyles |
| 2006/0048130 A1 | 3/2006 | Napier et al. |
| 2006/0059228 A1 | 3/2006 | Kasamsetty et al. |
| 2006/0067236 A1 | 3/2006 | Gupta |
| 2006/0075199 A1 | 4/2006 | Kallahalla et al. |
| 2006/0098618 A1 | 5/2006 | Bouffioux |
| 2006/0136676 A1 | 6/2006 | Park et al. |
| 2006/0153099 A1 | 7/2006 | Feldman |
| 2006/0161753 A1 | 7/2006 | Aschoff et al. |
| 2006/0235795 A1 | 10/2006 | Johnson et al. |
| 2006/0271547 A1 | 11/2006 | Chen et al. |
| 2007/0005761 A1 | 1/2007 | Wolters |
| 2007/0011361 A1 | 1/2007 | Okada et al. |
| 2007/0112956 A1 | 5/2007 | Chapman et al. |
| 2007/0118694 A1 | 5/2007 | Watanabe et al. |
| 2007/0123276 A1 | 5/2007 | Parker et al. |
| 2007/0177198 A1 | 8/2007 | Miyata |
| 2007/0199058 A1 | 8/2007 | Baumgart et al. |
| 2007/0271604 A1 | 11/2007 | Webster et al. |
| 2007/0280243 A1 | 12/2007 | Wray et al. |
| 2007/0288921 A1 | 12/2007 | King et al. |
| 2008/0028389 A1 | 1/2008 | Genty et al. |
| 2008/0086515 A1 | 4/2008 | Bai et al. |
| 2008/0095176 A1 | 4/2008 | Ong et al. |
| 2008/0107112 A1 | 5/2008 | Kuo et al. |
| 2008/0205415 A1 | 8/2008 | Morales |
| 2008/0208681 A1 | 8/2008 | Hammad et al. |
| 2008/0215796 A1 | 9/2008 | Lam et al. |
| 2008/0222246 A1 | 9/2008 | Ebling et al. |
| 2008/0222375 A1 | 9/2008 | Kotsovinos et al. |
| 2008/0244030 A1 | 10/2008 | Leitheiser |
| 2008/0244471 A1 | 10/2008 | Killian et al. |
| 2008/0250407 A1 | 10/2008 | Dadhia et al. |
| 2008/0270704 A1 | 10/2008 | He et al. |
| 2008/0304516 A1 | 12/2008 | Feng et al. |
| 2008/0307258 A1 | 12/2008 | Challenger et al. |
| 2008/0310324 A1 | 12/2008 | Chaponniere |
| 2009/0025074 A1 | 1/2009 | Le Saint et al. |
| 2009/0097657 A1 | 4/2009 | Scheidt et al. |
| 2009/0150629 A1 | 6/2009 | Noguchi et al. |
| 2009/0199177 A1 | 8/2009 | Edwards et al. |
| 2009/0222815 A1 | 9/2009 | Dake |
| 2009/0235358 A1 | 9/2009 | Tolba |
| 2009/0240744 A1 | 9/2009 | Thomson et al. |
| 2009/0241108 A1 | 9/2009 | Edwards et al. |
| 2009/0249440 A1 | 10/2009 | Platt et al. |
| 2009/0276771 A1 | 11/2009 | Nickolov et al. |
| 2009/0282266 A1 | 11/2009 | Fries et al. |
| 2009/0300605 A1 | 12/2009 | Edwards et al. |
| 2009/0300641 A1 | 12/2009 | Friedman et al. |
| 2009/0310554 A1 | 12/2009 | Sun et al. |
| 2010/0017859 A1 | 1/2010 | Kelly |
| 2010/0023582 A1 | 1/2010 | Pedersen et al. |
| 2010/0046426 A1 | 2/2010 | Shenoy et al. |
| 2010/0057913 A1 | 3/2010 | DeHaan |
| 2010/0071035 A1 | 3/2010 | Budko et al. |
| 2010/0088335 A1 | 4/2010 | Mimatsu |
| 2010/0094999 A1 | 4/2010 | Rama et al. |
| 2010/0095000 A1 | 4/2010 | Kettler et al. |
| 2010/0153617 A1 | 6/2010 | Miroshnichenko et al. |
| 2010/0199089 A1 | 8/2010 | Vysogorets et al. |
| 2010/0212004 A1 | 8/2010 | Fu |

(56) References Cited

U.S. PATENT DOCUMENTS

| | | |
|---|---|---|
| 2010/0217927 A1 | 8/2010 | Song |
| 2010/0235649 A1 | 9/2010 | Jeffries et al. |
| 2010/0274984 A1 | 10/2010 | Inomata et al. |
| 2010/0287548 A1 | 11/2010 | Zhou et al. |
| 2010/0293285 A1 | 11/2010 | Oishi et al. |
| 2010/0303241 A1 | 12/2010 | Breyel |
| 2011/0010483 A1 | 1/2011 | Liljeberg |
| 2011/0022812 A1 | 1/2011 | van der Linden et al. |
| 2011/0055361 A1 | 3/2011 | DeHaan |
| 2011/0060882 A1 | 3/2011 | Efstathopoulos |
| 2011/0078363 A1 | 3/2011 | Yeh et al. |
| 2011/0085563 A1 | 4/2011 | Kotha et al. |
| 2011/0103389 A1 | 5/2011 | Kidambi et al. |
| 2011/0153697 A1 | 6/2011 | Nickolov et al. |
| 2011/0153838 A1 | 6/2011 | Belkine et al. |
| 2011/0179412 A1 | 7/2011 | Nakae et al. |
| 2011/0191485 A1 | 8/2011 | Umbehocker |
| 2011/0191768 A1 | 8/2011 | Smith |
| 2011/0197024 A1 | 8/2011 | Thomas |
| 2011/0231280 A1 | 9/2011 | Farah |
| 2011/0246767 A1 | 10/2011 | Chaturvedi et al. |
| 2011/0258441 A1 | 10/2011 | Ashok et al. |
| 2011/0296157 A1 | 12/2011 | Konetski et al. |
| 2011/0302400 A1 | 12/2011 | Maino et al. |
| 2011/0302415 A1 | 12/2011 | Ahmad et al. |
| 2012/0060018 A1 | 3/2012 | Shinde et al. |
| 2012/0063458 A1 | 3/2012 | Klink et al. |
| 2012/0084570 A1 | 4/2012 | Kuzin et al. |
| 2012/0084768 A1 | 4/2012 | Ashok et al. |
| 2012/0089981 A1 | 4/2012 | Tripathi et al. |
| 2012/0159634 A1 | 6/2012 | Haikney et al. |
| 2012/0173866 A1 | 7/2012 | Ashok et al. |
| 2012/0179796 A1 | 7/2012 | Nagaraj et al. |
| 2012/0185688 A1 | 7/2012 | Thornton |
| 2012/0191912 A1 | 7/2012 | Kadatch et al. |
| 2012/0215050 A1 | 8/2012 | Hu |
| 2012/0233678 A1 | 9/2012 | Pal |
| 2012/0233705 A1 | 9/2012 | Boysen et al. |
| 2012/0246637 A1 | 9/2012 | Kreeger et al. |
| 2012/0266159 A1 | 10/2012 | Risbood et al. |
| 2013/0074181 A1 | 3/2013 | Singh |
| 2013/0081014 A1 | 3/2013 | Kadatch et al. |
| 2013/0117801 A1 | 5/2013 | Shieh et al. |
| 2013/0212709 A1 | 8/2013 | Tucker |
| 2013/0227303 A1 | 8/2013 | Kadatch et al. |
| 2013/0262405 A1 | 10/2013 | Kadatch et al. |
| 2013/0276068 A1 | 10/2013 | Alwar |

OTHER PUBLICATIONS

Primet, Pascale, et al.., "HIPCAL: State of the Art of OS and Network virtualization solutions for Grids", Sep. 14, 2007, 38 pages.
Wikipedia, "IPSec", [online] [retrieved on Jan. 4, 2011]. Retrieved from the Internet: <URL: http://en.wikipedia.org/wiki/IPsec/>, 8 pages.
Abdull, AlastairIrvine, et al. "Generic Routing Encapsulation", [online] [retrieved on Jan. 4, 2011]. Retrieved from the Internet: <URL: http:/ / creativecommons. org/ licenses/ by-sa/ 3. 0/>, 5 pages.
Farinacci et al., "RFC 2784: Generic Routing Encapsulation (GRE)", Mar. 2000, The Internet Society, 10 pages.
Kent et al., "RFC 4301: Security Architecture for the Internet Protocol", Dec. 2005, The Internet Society, 102 pages.
Bucket Explorer. "What is my AWS Access and Secret Key." [Retrieved Apr. 26, 2011]. Retrieved from the Internet <URL: http://www.bucketexplorer.com/documentation/amazon-s3--what-is-my-aws-access-and-secret-key.html>, 1 page.
Hongkiat. "Amazon S3—The Beginner's Guide." [Retrieved on Apr. 26, 2011]. Retrieved from the Internet <URL: http://www.hongkiat.com/blog/amazon-s3-the-beginners-guide/>, 9 pages.
Myerson, Judith. "Creating Applications with Amazon EC2 and S3." O'ReillyOnLamp.com, May 13, 2008 [Retrieved on Apr. 26, 2011]. Retrieved from the Internet <URL: http://onlamp.com/pub/a/onlamp/2008/05/13/creating-applications-with-amazon-ec2-and-s3.html>, 8 pages.
Wikipedia. "OAuth." [online] [Retrieved on Jan. 20, 2011]. Retrieved from the Internet <URL: http://en.wikipedia.org/wiki/OAuth> , 3 pages.
Gowalla "API Documentation—Oauth." [Retrieved on Apr. 26, 2011]. Retrieved from the Internet <URL: http://gowalla.com/api/docs/oauth>, 4 pages.
Apache HTTP Server Version 2.0. "Log Files." [Retrieved on Feb. 15, 2011]. Retrieved from the Internet <URL: http://httpd.apache.org/docs/2.0/logs.html>, 7 pages.
Microsoft Support. "How to view and manage event logs in Event Viewer in Windows XP." May 7, 2007, version 3.5 [Retrieved on Feb. 15, 2011]. Retrieved from the Internet <URL: http://support.microsoft.com/kb/308427>, 6 pages.
MSDN. "Visual Basic Concepts, Visual Studio 6.0: Centralized Error Handling." [Retrieved on Feb. 15, 2011]. Retrieved from the Internet <URL: http://msdn.microsoft.com/en-us/library/aa240795(d=printer, v=vs.60).aspx>, 4 pages.
Laitinen, Aapo et al., Network Address Translation [Retrieved on Oct. 10, 2011] Retrieved from the Internet: <URL: http://en.wikipedia.org/wiki/Networkpages_Address_and_Port_Translation>, 11 pages.
Wikipedia., Anycast [Retrieved on Oct. 10, 2011] Retrieved from the Internet: URL<http://en.wikipedia.org/wiki/Anycast>, 5 pages.
VMCI Overview [Retrieved on Jun. 8, 2011] Retrieved from the Internet: <URL: http://pubs.vmware.com/vmci-sdk/VMCI_intro.html>, 3 pages.
VMware vSphere [Retrieved on Jun. 8, 2011] Retrieved from the Internet: <URL: http://www.vmware.com/products/vmotion/overview.html>, 2 pages.
Travostino, Franco, et al., Seamless Live Migration of Virtual Machines over the MAN/WAN, 2006, Elsevier Future Generation Computer Systems 2006, 10 pages.
VMCI Datagram API [Retrieved on Jun. 8, 2011], Retrieved from the Internet: <URL: http://pubs.vmware.com/vmci-sdk/datagram html>, 1 page.
VMCI Datagram_SendTo [Retrieved on Jun. 8, 2011], Retrieved from the Internet: <URL: http://pubs.vmware.com/vmci-sdk/functions/VMCIDatagram_SendTo.html>, 1 page.
VMCIDs_Lookup [Retrieved on Jun. 8, 2011], Retrieved from the Internet: <URL: http://pubs.vmware.com/vmci-sdk/functions/VMCIDs_Lookup.html>, 2 pages.
Chen, Per M., et al., : "Maximizing Performance in a Striped Disk Array", 17th Annual International Symposium on Computer Architecture (SIGARCH 1990), 18 pages.
Sarhan, Nabil J., et al., "Caching and Scheduling in NAD-Based Multimedia Servers"; IEEE Computer Society, IEEE Transactions on Parallel and Distributed Systems, vol. 15, No. 10, Oct. 2004; pp. 921-933.
Vazhkudai, Sudharshan S., et al.; "Constructing Collaborative Desktop Storage Caches for Large Scientific Datasets"; ACM Journal Name, vol. V, No. N, Jun. 2006, 34 pages.
OMG, Deployment and Configuration of Component-based Distributed Applications Specification—Version 4.0, OMG, 2006, pp. 1-160.
Cala et al., "Automatic Software Deployment in the Azure Cloud", IFIP International Federation for Information Processing, 2010, pp. 1-14.
RSA Laboratories, "PKCS #11 v2.20: Cryptographic Token Interface Standard," Jun. 28, 2004, RSA Security Inc. (407 pages).
Amazon Auto Scaling—Getting Started Guide—API Version Aug. 1, 2010. Amazon Web Services LLC, 2010, 20 pages.
Amazon Auto Scaling—Developer Guide—API Version Aug. 1, 2010. Amazon Web Services LLC, 2011, 62 pages.
Amazon CloudWatch—Developer Guide—API Version Aug. 1, 2010. Amazon Web Services LLC, 2010, 75 pages.
Benincosa. "Ganglia and Nagios, Part 2: Monitor enterprise clusters with Nagios-Install Nagios to effectively monitor a data center; make Ganglia and Nagios work together," 2009, 20 pages.

(56) References Cited

OTHER PUBLICATIONS

'Nagios' [online]. "Monitoring Linux/Unix Machines," 2011, [retrieved on Feb. 3, 2011]. Retrieved from the Internet: URL: <http://nagios.sourceforge.net/docs/3_0/monitoring-linux.html > 1 page.
'Nagios' [online]. "Nagios Plugins," 2011, [retrieved on Feb. 3, 2011]. Retrieved from the Internet: URL: <http://nagios.sourceforge.net/docs/3_0/plugins.html > 2 pages.
'Zabbix' [online]. "Zabbix 1.8: The Ultimate Open Source Monitoring Solution," 2001-2012, [retrieved on Feb. 3, 2011]. Retrieved from the Internet: URL: <http://www.zabbix.com/features.php.> 1 page.
Amazon Elastic Compute Cloud, User Guide, API Version Mar. 1, 2012, pp. 97-103, downloaded from http://docs.amazonwebservices.com/AWSEC2/latest/UserGuide/AESDG-chapter-instancedata.html?r=4276 on Mar. 18, 2012.
Paravirtualization, Wikipedia Article, downloaded from http://en.wikipedia.org/wiki/Paravirtualization on Mar. 18, 2012.
Paravirtualized File Systems, Eric Van Hensbergen, downloaded from http://www.slideshare.net/ericvh/9p-on-kvm on Mar. 18, 2012.
"IPsec". Creativecommons.org [online]. Creative Commons Attribution—Share Alike 3.0 Unported. [retrieved on Jan. 14, 2011]. Retrieved from the Internet:<URL: http://creativecommons.org/licenses/by-sa/3.0/>, pp. 1-8.
"Generic Routing Encapsulation". Creativecommons.org [online]. Creative Commons Attribution—Share Alike 3.0 Unported. [retrieved on Jan. 14, 2011]. Retrieved from the Internet:<URL: http://creativecommons.org/licenses/by-sa/3.0/>, pp. 1-5.
Cloud Computing Course, Part 2: Amazon's EC2, Marcel Gagne, Jun. 13, 2011. Retrieved from the Internet: <URL: http://marcelgagne.com/content/cloud-computing-course-part-2-amazons-ec2>, 6 pages.
How to: Getting Started With Amazon EC2, Paul Stamatiou, Apr. 5, 2008. Retrieved from the Internet: <URL:http//paulstamatiou.com/how-to-getting-started-with-amazon-ec2>, 25 pages.
Uploading Personal ssh Keys to Amazon EC2, Eric Hammond, Oct. 14, 2010. Retrieved from the Internet: <URL:http://alestic.com/2010/10/ec2-ssh-keys>, 3 pages.
Key Management In Cloud Datacenters, Security Stackexchange.com, Retrieved from the Internet on Nov. 18, 2011; Retrieved from: <URL: http://security.stackexchange.com/questions/2514/key-management-in-cloud-datacenters>, 2 pages.
Managing Amazon EC2—SSH Login and Protecting Your Instances, Everyday's Findings, Monday, May 18, 2009, Retrieved from the Internet on Nov. 18, 2011; Retrieved from: <URL: http://blog.taggesell.de/index.php?/aarchives/73-Managing-Amazon-EC2., 6 pages.
Using and Managing AWS—Part 6: SSH Key Pairs, Top WordPress, May 26, 2009, Retrieved from the Internet: <URL: http://clouddb.info/2009/05/26/using-and-managing-aws-part-6-ssh-key-pairs>, 5 pages.
Alpern, B., "The Jalapeno virtual machine," IBM Systems Journal, Jan. 2000, vol. 39, Issue 1, pp. 211-238.
Bok, Jin Yo, Authorized Officer for Korean Intellectual Property Office, International Search Report and Written Opinion for PCT/US2012/029210, International Search Report completed Oct. 10, 2012, 2 pages.
Anonymous, "Storage I/O Control Technical Overview and Consideration for Deployment," VMware vSphere™ 4.1, Jan. 1, 2010, XP05504491, retrieved from the internet: URL: http://www.vmware.com/fled/pdf/techpaper/WMW-vSphere41-SIOC.pdf; [retrieved on Nov. 21, 2012], the entire document.
Cabellos et al., LISPmob: Mobile Networking through LISP, Apr. 2, 2012, 8 pages.
Steinmetz, Christof, Authorized Office for European Patent Office, International Search Report and Written Opinion for PCT/US2013/034140, completed Jun. 25, 2013, 21 pages.
Hehn, Eva, Authorized Office for European Patent Office, International Search Report and Written Opinion for PCT/US2013/027456, completed Jun. 24, 2013, 11 pages.
Eng, Lili, Australian Government, IP Australia, Examiner's First Report for 2012200562, dated Jun. 4, 2012, 2 pages.

PROVIDING SNAPSHOTS OF VIRTUAL STORAGE DEVICES

CROSS-REFERENCE TO RELATED APPLICATIONS

This application is a continuation application and claims priority under 35 U.S.C. §120 to U.S. application Ser. No. 14/629,149, filed Feb. 23, 2015, which is a continuation of U.S. application Ser. No. 13/602,974, filed Sep. 4, 2012 (now U.S. Pat. No. 8,966,198), which claims priority under 35 U.S.C. §119(e)(1), to U.S. Provisional Application Ser. No. 61/530,358, filed on Sep. 1, 2011, the entire contents of each of which are incorporated herein by reference.

BACKGROUND

This specification relates to providing snapshots of virtual storage devices.

Cloud computing is network-based computing in which typically large collections of servers housed in data centers or "server farms" provide computational resources and data storage as needed to remote end users. Some cloud computing services provide access to software applications such as word processors and other commonly used applications to end users who interface with the applications through web browsers or other client-side software. Users' electronic data files are usually stored in the server farm rather than on the users' computing devices. Maintaining software applications and user data on a server farm simplifies management of end user computing devices. Some cloud computing services allow end users to execute software applications in virtual machines.

SUMMARY

This specification describes technologies relating to providing snapshots of virtual storage devices.

In general, one aspect of the subject matter described in this specification can be embodied in methods that include receiving, at a computer system, a request to create a snapshot of a virtual storage device, wherein the virtual storage device virtually stores data at virtual addresses, the data being physically stored at a plurality of physical storage locations that are managed by an underlying storage system associated with virtual storage device, the plurality of physical storage locations being associated with physical addresses and being distributed across a plurality of physical storage devices, the underlying storage system managing storage of the data across the plurality of physical storage devices using unique identifiers that are: i) independent of the plurality of physical storage devices and the plurality of physical storage locations and ii) different from the virtual addresses. The methods can further include identifying, by the computer system, one or more regions of the virtual storage device that have been written to since a previous snapshot of the virtual storage device was created, wherein data written to the one or more identified regions is stored in the plurality of physical storage locations separately from other stored data that corresponds to other snapshots of the one or more regions. The methods can additionally include generating a unique identifier for the requested snapshot; and creating the requested snapshot using the identified one more regions and the unique identifier, wherein the requested snapshot includes a mapping of the unique identifier to the one or more identified regions of the virtual storage device and does not include any data stored in the virtual storage device.

Particular embodiments of the subject matter described in this specification can be implemented so as to realize one or more of the following advantages. Snapshots of virtual storage devices can be efficiently created, retrieved, and maintained. For example, instead of creating a copy of the actual data that is being stored by a virtual storage device, a snapshot can be created to include information that identifies persistent storage locations where the data is being storage. In another example, snapshots can build upon each other so that each snapshot can store only information identifying the portions of a virtual storage device that were written to since a previous snapshot was created, instead of each snapshot storing the entire index of a virtual storage device. For instance, if an example virtual storage device includes 500 regions and only 10 of those regions were written to since the previous snapshot of the virtual storage device was created, then a new snapshot of the virtual storage device can be created to include information identifying the 10 regions instead of all 500 regions. By including less information, each snapshot can be created and/or retrieved quickly, can save computational resources, and/or can reduce lag time associated with creating and/or restoring snapshots of a virtual storage device.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
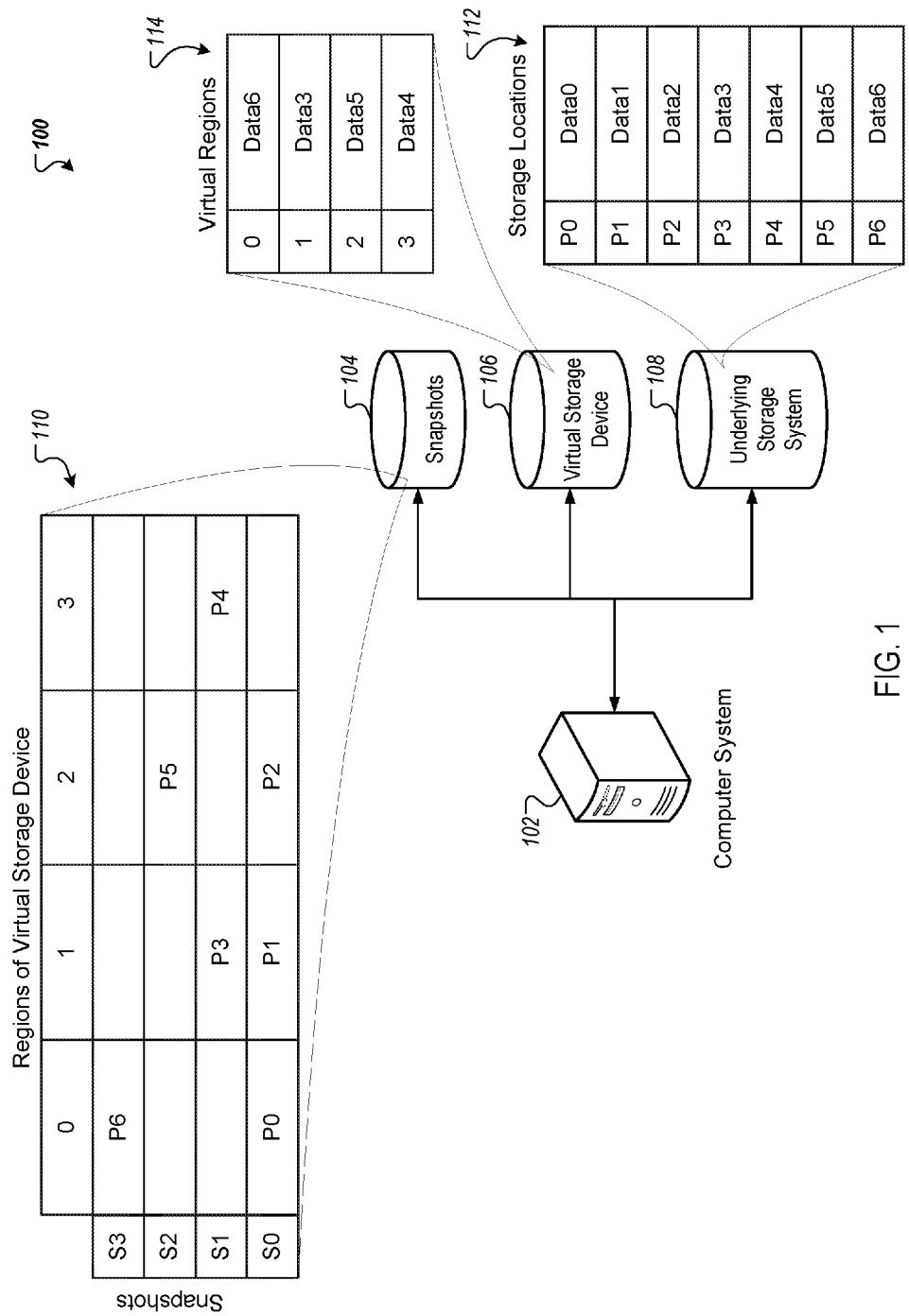
FIG. 1 is conceptual diagram of an example system that provides snapshots of a virtual storage device.

Data that is stored by a storage device, such as a physical storage device (e.g., hard disc drives, solid-state drives) and a virtual storage device (e.g., virtualized storage system using one or more physical storage devices and one or more layers of abstractions to separate physical and logical storage locations), can continuously change over time. For instance, a portion of a storage device may at one point in time store an executable file and at another point in time store a word processing document. A snapshot of a storage device is a record of the contents of the storage device at a point in time. Snapshots can be used to restore and/or recreate previous states of a storage device. For example, snapshots can be used to allow a user to go back in time to recover the state of a storage device at a point in the device's history.

This document discusses a variety of techniques for providing efficient snapshots for virtual storage devices. A virtual storage device can be implemented in a variety of computing environments. For example, virtual storage devices can be used as part of a cloud computing system to provide remote clients with one or more virtualized persistent storage arrays to which information can be stored and retrieved. Similarly, virtual storage devices can be implemented as storage devices for virtual machines. In another example, virtual storage devices can be implemented locally on a computing device using one or more physical storage devices and one or more layers of abstraction.

A snapshot for a virtual storage device maps regions of the virtual storage device to storage locations in an underlying storage system. Storage devices, both virtual and physical, can store and retrieve data from regions of storage devices. Regions can be variable in size and can be addressable at any location in a storage device. An underlying storage system is a computer system that stores data for one or more virtual storage devices using various levels of abstraction. For example, an underlying storage system can be a cloud computing system that stores data across a networked system of one or more computer servers and physical storage devices. Such cloud computing systems can use various unique identifiers for data, such as a combination of a row identifier, a column identifier, and a timestamp for data stored in one or more tables. Such unique identifiers can be independent one or more physical locations where data is being stored—the underlying storage system can manage correlating such unique storage location identifiers to one or more physical storage locations. In another example, an underlying storage system can be one or more computing devices that are providing a virtual machine and one or more corresponding virtual storage devices. In another example, an underlying storage system can be a file management system on a local computing device (e.g., desktop computer, laptop computer, smartphone) that correlates logical addresses to physical storage locations of one or more physical storage locations that are accessible to the local computing device.

Data written to the same regions of a virtual storage device at different times can be mapped to and persistently stored in different storage locations in an underlying storage system. For example, data written to a first region of a virtual storage device at a first time can be stored in a first storage location of an underlying storage system. If new data is written to the first region of the virtual storage device at a later second time, the new data can be stored in a second storage location of the underlying system that is different from the first storage location. The original data stored in the first storage location and the new data stored in the second storage location can be persistently and concurrently maintained as part of the underlying storage system, even though in the current state of the virtual storage device original data has been overwritten with the new data. Such concurrent and persistent storage of previous versions of data in an underlying storage system can allow for snapshots to be efficiently created and maintained—instead of having to copy data for a snapshot, only the storage location of relevant data is tracked.

Snapshots can build upon each other so that a snapshot only includes the regions of the virtual storage device that were written since the previous snapshot was created. For instance, a simplified example of a virtual storage device includes regions 0-3 and a first snapshot maps regions 0-2 of the virtual storage device to storage locations in an underlying storage system. After creating the first snapshot, data is written to regions 2 and 3 of the virtual storage device and then a second snapshot of the virtual storage device is created. The second snapshot can map to only regions 2 and 3, which have been modified since the previous first snapshot. Regions that are included in a snapshot can include portions of files that have changed since a previous snapshot. For example, if the phrase "hello world" in a text file (e.g., .txt file) is changed to "Hello World," only the regions of the text file that have changed (e.g., bytes that have changed from ASCII values for 'h' and 'w' to 'H' and 'W') can be added to a snapshot instead of all of the regions of the text file.

To recreate a snapshot of a virtual storage device, the snapshots for the virtual storage device are analyzed in reverse chronological order starting with the snapshot to be recreated until the most recent copy of each region has been identified. For instance, referring to the example in the previous paragraph, to recreate the second snapshot corresponding storage locations for regions 2 and 3 are first identified from the mapping for the second snapshot. Moving back in time from the second snapshot, the first snapshot is analyzed and the remaining regions, regions 0 and 1, are identified in the mapping for the first snapshot. Thus, the second snapshot can be recreated by using the data associated with regions 0 and 1 in the first snapshot and the data associated with regions 2 and 3 in the second snapshot.

FIG. 1 is conceptual diagram of an example system 100 that provides snapshots of a virtual storage device. The example system 100 is includes a computer system 102 that provides snapshots 104 of a virtual storage device 106 using an underlying storage system 108. The computer system 102 can include any of a variety of appropriate computing devices, such as a client computing device (e.g., laptop computer, smartphone, tablet computing device) that is interfacing over one or more communications network (e.g., the Internet, local area network (LAN), 3G/4G wireless network) with a cloud computing system, a virtual machine that is implemented across one or more networked computing devices, and/or a standalone computing device (e.g., laptop computer, smartphone, desktop computer). Other computing devices may also be included in the computer system 102.

The snapshots 104 can be any of a variety of appropriate data repositories for snapshot information, such as one or more databases, files, and/or computing devices. The virtual storage device 106 is a virtualization of one or more physical storage devices. For example, the virtual storage device 106 can include virtual storage locations (e.g., storage locations that are not physical storage locations but instead correspond to one or more physical storage locations of one or more physical storage devices) that are identified by virtual addresses (e.g., addresses that correspond to virtual storage locations of the virtual storage device 106). The virtual storage device 106 can be accessed and used by computing devices similar manner to physical storage devices. For example, computing devices can issue the same commands to write to and read from the virtual storage device 106 that would be issued to a physical storage device. Various information and/or data structures can be associated with the virtual storage device 106 to provide the virtual storage device 106, such as indices mapping regions of the virtual storage device 106 to storage locations in the underlying storage system 108, and/or information tracking which regions of the virtual storage device 106 have been written to since the previous snapshot was created. The underlying storage system 108 can include any of a variety of appropriate computer systems and/or physical storage devices, such a cloud computing system, a disc management system accessible over a communication network (e.g., the Internet, a LAN), and/or a local disc management system on a computing device.

The system 100 is depicted as including a table 110 depicting example snapshots S0-S3 for the virtual storage device 106, which is presented as having regions 0-3. As described above, the snapshots S0-S3 can include a mapping of regions of the virtual storage device 106 to storage locations in the underlying storage system 108. In this example, the storage locations in the underlying storage system 108 are identified as P0-P6. The storage locations P0-P6 can be any of a variety of identifiers to uniquely identify corresponding data in the underlying storage system 108, such as information identifying physical addresses in the underlying storage system 108 (e.g., pointers to physical addresses), information identifying logical addresses in the underlying storage system 108 (e.g., pointers to logical addresses), information identifying unique identifiers that are used by the underlying storage system 108 and that are independent of the physical storage devices and physical storage locations where the data is being physically stored (e.g., unique identifiers that include combinations of row, column, and/or timestamp information that are used by cloud computing systems to identify data stored across a plurality of physical storage devices), and/or a combination of one or more values that can be used to locate data in the underlying storage system 108. For example, the underlying storage system 108 can include a database that provides access to the data for the virtual storage device 106. The storage locations P0-P6 can each include one or more values that are used to search fields of the database to locate corresponding data in the underlying storage system 108. For instance, such data values can include row and column identifiers for a table that the underlying storage system 108 uses to store data for the virtual storage device 106.

The snapshots S0-S3 can be implemented in a variety of ways. For instance, the snapshots S0-S3 can be implemented collectively as part of a data structure (e.g., multi-dimensional array) that maps the regions of the virtual storage device 106 to the storage locations P0-P6 of the underlying storage system 108, similar to the example table 110. In another example, each of the snapshots S0-S3 can be implemented separately (e.g., separate file, separate table, separate data structure) and can include information that correlates the regions 0-3 of the virtual storage device 106 to the storage locations P0-P6 of the underlying storage system 108.

The snapshots S0-S3 can include a unique identifier that encodes a sequential order among the snapshots S0-S3. For example, the snapshots S0-S3 can be associated with a timestamp that indicates a time at which the snapshot S0-S3 was created. In another example, the snapshots S0-S3 can be associated with a unique identifier (e.g., an integer) that is incremented for each snapshot. Such example unique identifiers can be used to not only identify and refer to a snapshot, but can also be used to determine a sequence in which the snapshots S0-S3 were created. The sequence of the snapshots S0-S3 can be used to recreate a snapshot by moving in revers chronological order through the snapshots S0-S3 until storage locations for each of the regions 0-3 of the virtual storage device 106 have been located.

In one example implementation, each of the snapshots S0-S3 can be uniquely identified by timestamps and can include a list of the regions of the virtual storage device 106 and the corresponding storage locations in the underlying storage system 108. In such a list, the regions may be encoded in the information identifying the storage locations in the underlying storage system 108. For instance, a storage location P0-P6 can be identified by a combination of a unique identifier for the virtual storage device 106, the corresponding region of the virtual storage device 106, and a timestamp corresponding to the relevant snapshot S0-S1.

As depicted in the table 110, each of the snapshots S0-S3 can include information that maps fewer than all of the regions 0-3 of the virtual storage device 106 to the underlying storage system 108. For instance, the snapshot S3 maps only region 0 to the storage location P6 of the underlying storage system 108. Snapshots S0-S3 can be created to only map the regions of the virtual storage device 106 that have changed (e.g., been written to) since a previous snapshot. For instance, the example table 110 indicates that after creating the snapshot S0, data was written to regions 1 and 3 of the virtual storage device 106 at storage locations P3 and P4 of the underlying storage system 108, respectively. Thus, the snapshot S1 includes only information identifying this change in the virtual storage device 106 over the previous snapshot S0. Such a configuration can allow for snapshots to be quickly created (e.g., the mapping does not have to include information for all regions, but only a subset of the regions) and to minimize the amount of storage space occupied by the snapshots.

The snapshots S0-S3 can allow a user to move back in time for the virtual storage device 106 to any of the previous states of the device 106 that were captured by the snapshots S0-S3. The state of the virtual storage device 106 at any one of the snapshots S0-S3 can be recreated by going to the snapshot of interest and then moving in reverse chronological order until the most recent version of each of the regions 0-3 of the virtual storage device 106 is located. For example, to recreate the snapshot S2, first the regions that are included in the snapshot S2 are identified. In this example, the mapping of region 2 to storage location P5 is identified. Since mappings for regions 0, 1, and 3 have not been identified, the recreation moves to examine snapshot S1, which was created before the snapshot S2. Snapshot S1 maps regions 1 and 3 to storage locations P3 and P4, respectively. Snapshot S0 is then examined to identify an entry for region 0, which is mapped in snapshot S0 to storage location P0. The entries in snapshot S0 for regions 1 and 2 are not analyzed because more recent versions of these regions were located in snapshots 1 and 2. The resulting state of the virtual storage device 106 at snapshot S2 includes the following: region 0—storage location P0; region 1—storage location P3; region 2—storage location P5; region 3—storage location P4.

The virtual storage device 106 does not have to be recreated in its entirety—a portion of the virtual storage device 106 can be recreated using the snapshots S0-S3.

Table 112 provides an example of data (Data0-Data6) that can be stored by the underlying storage system 108. Using the snapshot 104 and the underlying storage system 108, data values that have been overwritten in the virtual storage device 106 can be persistently maintained without having to copy or move the data that has been overwritten. For instance, at snapshot S0 the region 1 stores Data1 (cross-referencing storage location P1 from the table 110 with the entry for P1 in the table 112), but is then rewritten with Data3 at snapshot S1 (cross-referencing storage location P3 from the table 110 with the entry for P3 in the table 112). However, the storage location P1 associated with region 1 at snapshot S0 is not rewritten with Data3, but instead the new data value Data3 is written to a new storage location P3 of the underlying storage system 108. Thus, the mapping of snapshot S0 does not have to be altered as regions that are mapped to in the snapshot S0 are rewritten and any older data that has been rewritten in the virtual storage device 106 can be persistently maintained in the underlying storage system 108 without having to be relocated.

Table 114 provides an example view of the state of the virtual storage device 106 at the time of snapshot S3, with the data mapping for the regions 0-3 resolved against the data stored in the underlying storage system 108. A current state and historical states of the virtual storage device 106 can appear as a traditional storage device to the computer system 102, which can obtain data from and write data to the virtual storage device 106.

One or more of the snapshots 104 can be deleted for the virtual storage device 106. Since portions of a snapshot may be used to recreate other snapshots, deletion of a snapshot may be limited to situations where the regions mapped by a snapshot would no longer be used to recreate other snapshots. For example, the snapshot S0 may not be deleted since the mapped to regions 0 and 2 would be used to recreate the snapshot S1. In some implementations, regions that block deletion of a snapshot, such as the mapping for regions 0 and 2 for snapshot S0, can be added to the next chronological snapshot. For instance, the mapping of region 0 to storage location P0 and region 2 to storage location P2 can be added to snapshot S1, which can permit the snapshot S0 to be deleted. In conjunction with deleting a snapshot, corresponding storage locations in the underlying storage system 108 can be deleted and released.

In some implementations, if a user requests that a snapshot be deleted but the snapshot is unable to be deleted at the present time, the snapshot is made inaccessible to the user (e.g., removed from a list of user accessible snapshots) and is marked for deletion at a future time when deletion is possible. Such a marking can be used by a service (e.g., garbage collection operation) that periodically examines whether snapshots and their corresponding storage locations can be deleted.

Figure 2:
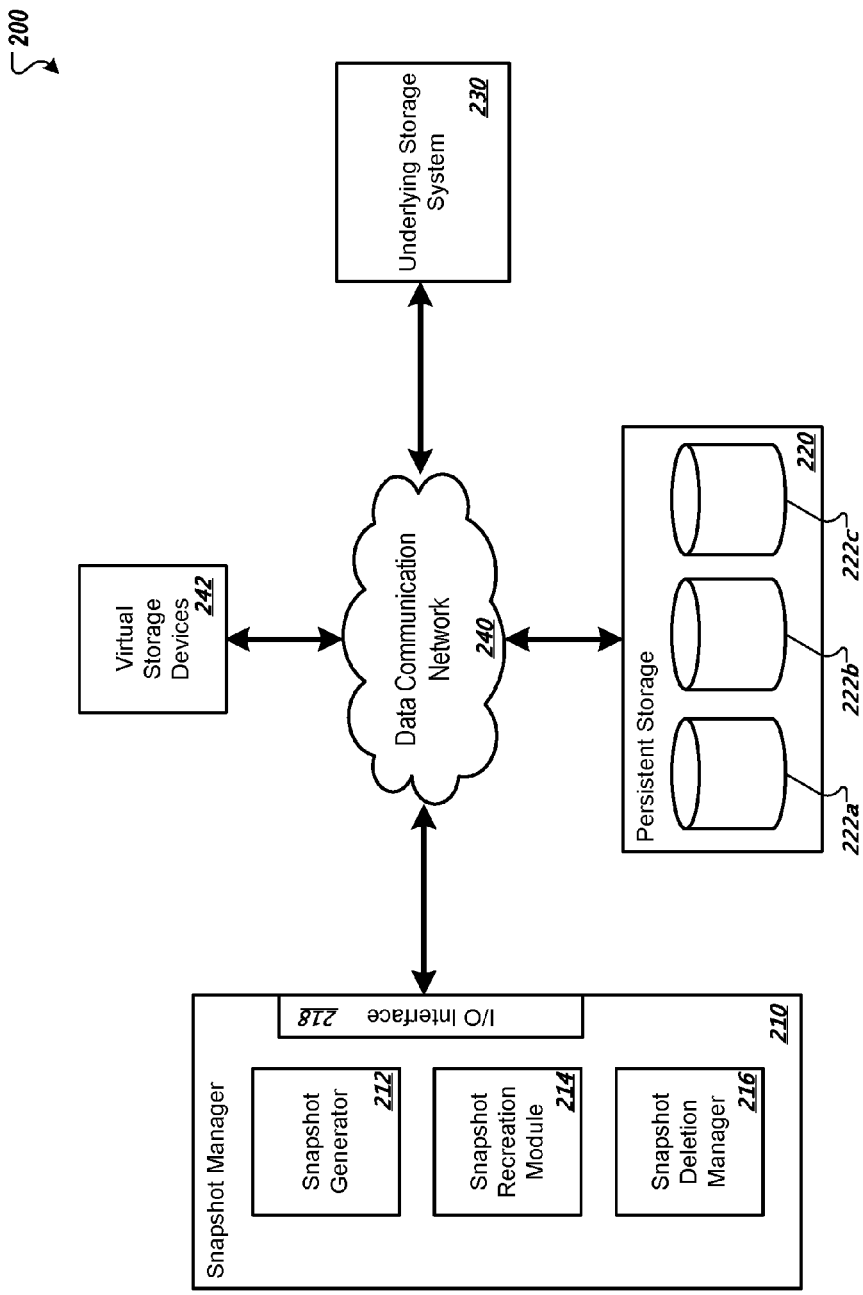
FIG. 2 is a schematic diagram of an example system for providing snapshots of a virtual storage device.

FIG. 2 is a schematic diagram of an example system 200 for providing snapshots of a virtual storage device. The system 200 is similar to the system 100 described above with regard to FIG. 1. The system 200 can be implemented by any of a variety of appropriate computing devices, such as the computer system 102 described above with regard to FIG. 1.

The system 200 includes a snapshot manager 210 that manages the creation, use, and deletion of snapshots for one or more virtual storage device(s) 242. The virtual storage devices 242 are similar to the virtual storage device 106 described above with regard to FIG. 1. The snapshot manager 210 includes a snapshot generator 212, a snapshot recreation module 214, a snapshot deletion manager 216, and an input/output (I/O) interface 218. The snapshot generator 212 creates new snapshots of the virtual storage devices 242. As described previously, snapshots can be generated using the regions of a virtual storage device that were modified (e.g., written) since a previous snapshot of the virtual storage device was created. The snapshot recreation module 214 recreates snapshots by scanning through snapshots in reverse chronological order until the most recent version of the regions of the portion of the virtual storage device to be recreated have been located. The snapshot deletion manager 216 manages deletion of snapshots as described above. The I/O interface 218 can be any of a variety of interfaces to communicate over a data communication network, such as an physical network (e.g., an internal bus), an internal network (e.g., LAN), and/or an external network (e.g., the Internet). For example, the I/O interface can be a wireless network card.

The system 200 further includes persistent storage 220 that can store snapshot information (e.g., snapshot mappings of virtual storage device regions to data storage locations) and/or data for the virtual storage devices 242. The persistent storage 220 can be replicated across multiple hard disks and/or other computer-readable media, e.g., disks 222a, 222b, and 222c.

The system 200 also includes an underlying storage system 230 that manages the storage of data for the virtual storage devices 242. The underlying storage system 230 is similar to the underlying storage system 108 described above with regard to FIG. 1.

The snapshot manager 210, the persistent storage 220, the underlying storage system 230, and/or the virtual storage devices 242 can be communicatively connected over a data communication networks 240. The data communication network 240 can include a combination of physical data channels (e.g., communication bus), internal networks (e.g., LAN), and/or external networks (e.g., the Internet).

Figure 3:
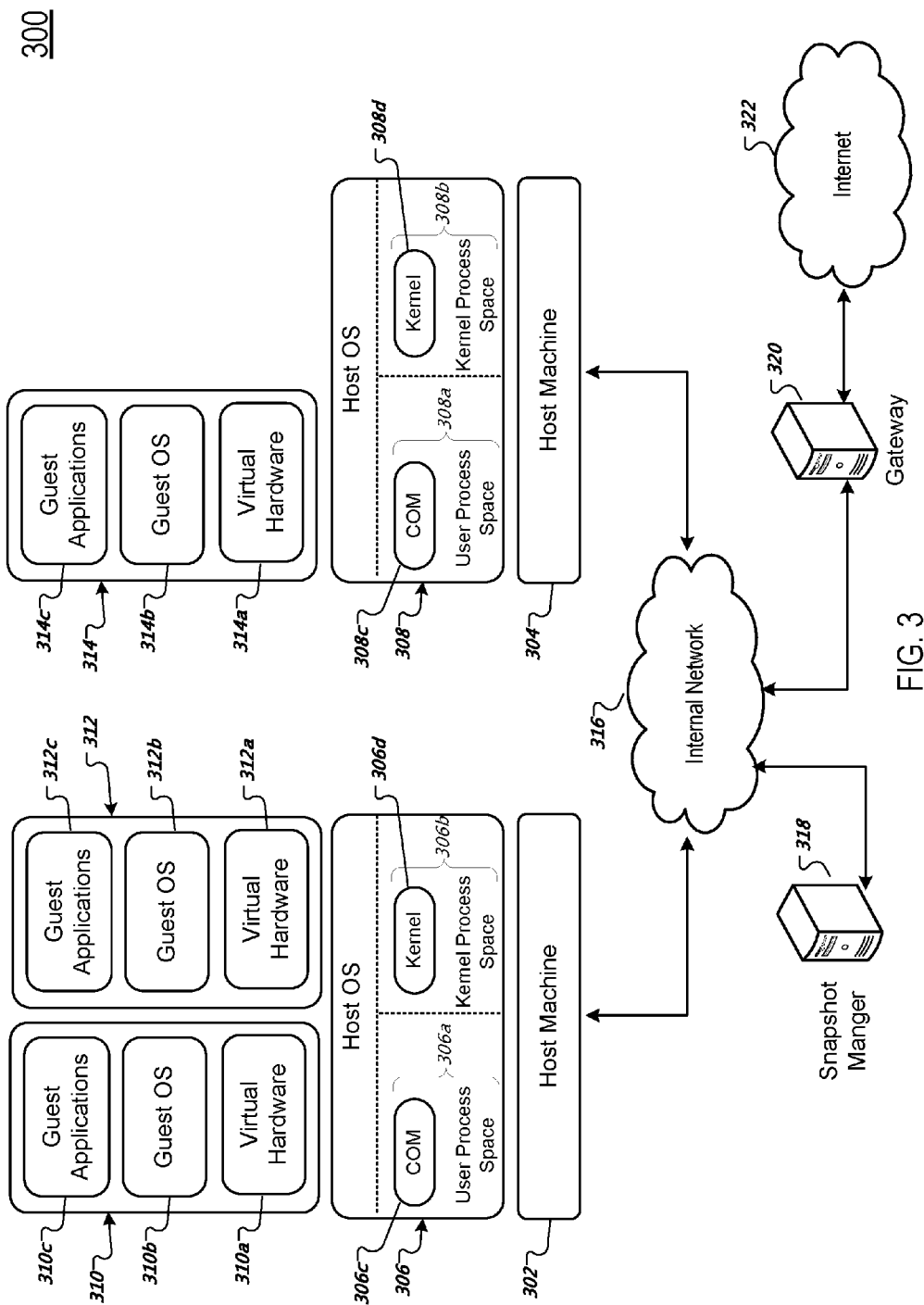
FIG. 3 is a schematic illustration of an example system in which snapshots of virtual storage devices are provided.

FIG. 3 is a schematic illustration of an example system 300 in which snapshots of virtual storage devices are provided. The system 300 is a virtual machine system that includes one or more host machines, for example, host machine 302 and host machine 304. Generally speaking, a host machine is one or more data processing apparatus such as a rack mounted servers or other computing devices. The data processing apparatus can be in different physical locations and can have different capabilities and computer architectures. Host machines can communicate with each other through an internal data communication network 316. The internal network can include one or more wired (e.g., Ethernet) or wireless (e.g., WI-FI) networks, for example. In some implementations the internal network 316 is an intranet. Host machines can also communicate with devices on external networks, such as the Internet 322, through one or more gateways 320 which are data processing apparatus responsible for routing data communication traffic between the internal network 316 and the external network 322. Other types of external networks are possible.

Each host machine executes a host operating system ("OS") or other software that virtualizes the underlying host machine hardware and manages concurrent execution of one or more virtual machines. For example, the host operating system 306 is managing virtual machine (VM) 310 and VM 312, while host OS 308 is managing a single VM 314. Each VM includes a simulated version of the underlying host machine hardware, or a different computer architecture. The simulated version of the hardware is referred to as virtual hardware (e.g., virtual hardware 310a, 312a and 314a). For example, the simulated hardware can include one or more virtual storage devices, such as the virtual storage device 106 and/or the virtual storage device 242. The virtual storage devices can be associated with physical disks that are local to the machine the virtual machine instance is running on or remotely located. Software that is executed by the virtual hardware is referred to as guest software. In some implementations, guest software cannot determine if it is being executed by virtual hardware or by a physical host machine. If guest software executing in a VM, or the VM itself, malfunctions or aborts, other VMs executing on the host machine will not be affected. A host machine's microprocessor(s) can include processor-level mechanisms to enable virtual hardware to execute software applications efficiently by allowing guest software instructions to be executed directly on the host machine's microprocessor without requiring code-rewriting, recompilation, or instruction emulation.

Each VM (e.g., VMs 310, 312 and 314) is allocated a set of virtual memory pages from the virtual memory of the underlying host operating system and is allocated virtual disk blocks from one or more virtual disk drives for use by the guest software executing on the VM. For example, host operating 306 allocates memory pages and disk blocks to VM 310 and VM 312, and host operating system 308 does the same for VM 314. In some implementations, a given VM cannot access the virtual memory pages assigned to other VMs. For example, VM 310 cannot access memory pages that have been assigned to VM 312. A virtual disk drive can be persisted across VM restarts. Virtual disk blocks are allocated on physical disk drives coupled to host machines or available over the internal network 316, for example. In addition to virtual memory and disk resources, VMs can be allocated network addresses through which their respective guest software can communicate with other processes reachable through the internal network 316 or the Internet 322. For example, guest software executing on VM 310 can communicate with guest software executing on VM 312 or VM 314. In some implementations, each VM is allocated one or more unique Internet Protocol (IP) version 4 or version 6 addresses and one or more User Datagram Protocol (UDP) port numbers.

A VM's guest software can include a guest operating system (e.g., guest operating systems 310b, 312b and 314b) which is software that controls the execution of respective guest software applications (e.g., guest applications 310c, 312c and 314c), within the VM and provides services to those applications. For example, a guest operating system could be a variation of the UNIX operating system. Other operating systems are possible. Each VM can execute the same guest operating system or different guest operating systems. In further implementations, a VM does not require a guest operating system in order to execute guest software applications. A guest operating system's access to resources such as networks and virtual disk storage is controlled by the underlying host operating system.

By way of illustration, and with reference to virtual machine 310, when the guest application 310c or guest operating system 310b attempts to perform an input/output operation on a virtual storage device (e.g., the virtual storage device 106), initiate network communication, or perform a privileged operation, for example, the virtual hardware 310a is interrupted so that the host operating system 306 can perform the action on behalf of the virtual machine 310. The host operating system 306 can perform these actions with a process that executes in kernel process space 306b, user process space 306a, or both.

The kernel process space 306b is virtual memory reserved for the host operating system 306's kernel 306d which can include kernel extensions and device drivers, for instance. The kernel process space has elevated privileges (sometimes referred to as "supervisor mode"); that is, the kernel 306d can perform certain privileged operations that are off limits to processes running in the user process space 306a. Examples of privileged operations include access to different address spaces, access to special functional processor units in the host machine such as memory management units, and so on. The user process space 306a is a separate portion of virtual memory reserved for user mode processes. User mode processes cannot perform privileged operations directly.

In various implementations, a portion of VM network communication functionality is implemented in a communication process (e.g., communication process 306c). In some implementations, the communication process executes in the user process space (e.g., user process space 306a) of a host operating system (e.g., host operating system 306). In other implementations, the communication process can execute in the kernel process space (e.g., kernel process space 306d) of the host operating system. There can be a single communication process for all VMs executing on a host machine or multiple communication processes, e.g., one for each VM executing on the host machine. In yet further implementations, some portion of the communication process executes in the user process space and another portion executes in the kernel process space.

The communication process communicates with a snapshot manager 318 to provide snapshots for the virtual storage devices that are provided with the virtual hardware 310a, 312a, and 314a. The snapshot manger 318 can provide snapshots similar to the snapshots described above with regard to systems 100 and 200, and the snapshot manager can be similar to the snapshot manager 210 described above with regard to FIG. 2.

Figure 4:
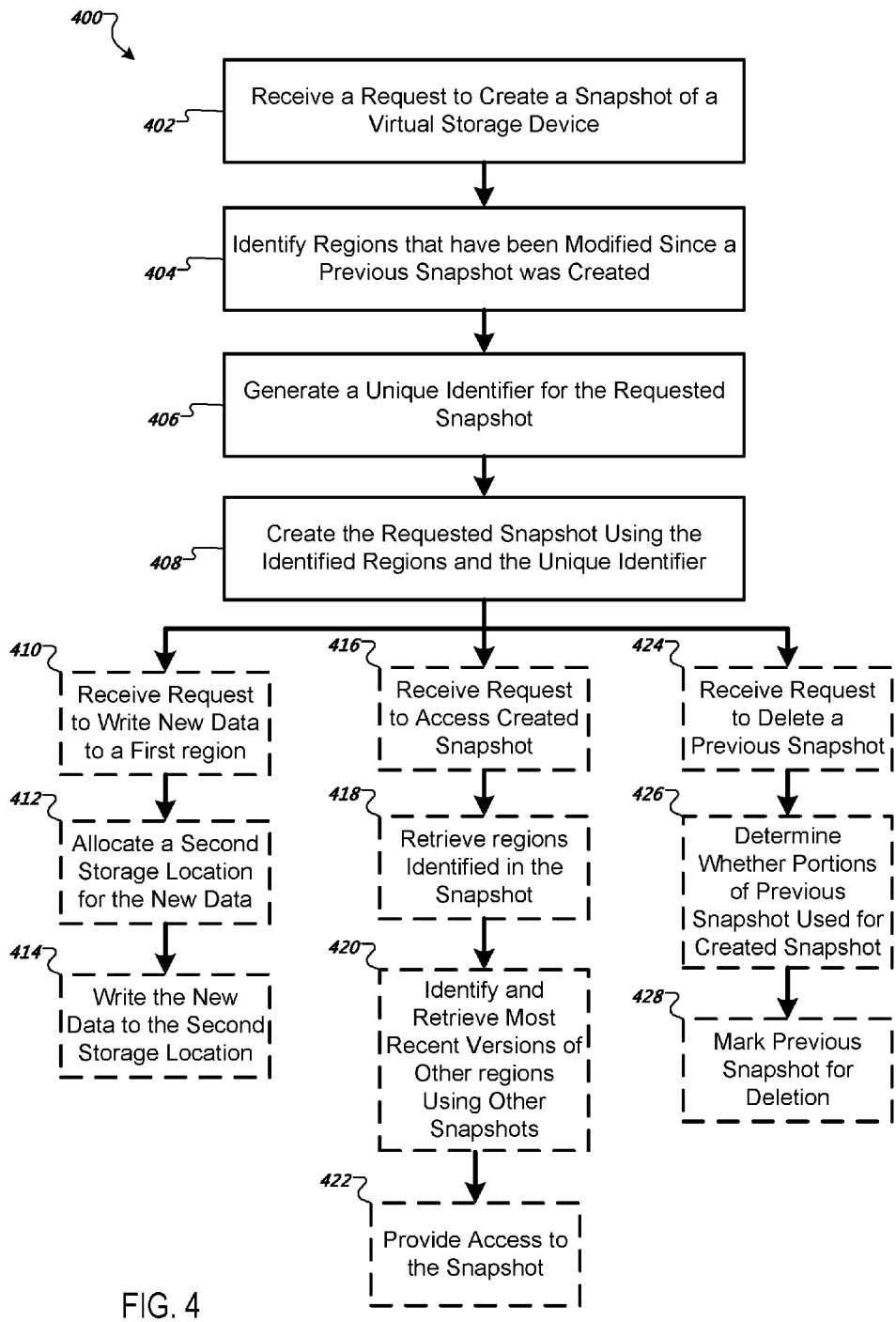
FIG. 4 is a flow diagram of an example process for providing snapshots for a virtual storage device.

FIG. 4 is a flow diagram of an example process 400 for providing snapshots for a virtual storage device. The process 400 can be performed by any of a variety of appropriate computing devices, such as the computer system 102 described above with regard to FIG. 1, the system 200 described above with regard to FIG. 2, and/or the system 300 described above with regard to FIG. 3.

The process 400 includes receiving a request to create a snapshot of a virtual storage device (402). For instance, the snapshot manager 318 can receive requests to create snapshots of virtual storage devices from any of a variety of appropriate sources, such a one or more of the VMs 310-314, the host machines 302-304, and/or client computing device (e.g., laptop computer, desktop computer, smartphone) that can communicate with the snapshot manager 318 over the Internet 322 but which are not depicted in FIG. 3.

In response to receiving the request, one or more regions of the virtual storage device that have been modified (e.g., written to) since a previous snapshot was created are identified (404). For example, the snapshot generator 212 described above with regard to FIG. 2 creates new snapshots of the virtual storage devices 242 by identifying regions of the virtual storage devices 242 that were modified (e.g., written to) since a previous snapshot of the virtual storage device was created. Such identification can be made by the snapshot generator 212 using any of a variety of appropriate techniques, such as by performing a diff operation with regard to the current state of the virtual storage devices 242 and the most recent snapshots created for the virtual storage devices 242. For instance, referring to FIG. 1, if the most recent snapshot for the virtual storage device 106 is the snapshot S2, the computer system 102 can identify that region 0 of the virtual storage device 106 was modified by comparing a current state of the virtual storage device 106, as presented in the table 114, with the S2 snapshot, as presented in table 110. Using the techniques discussed above to recreate the snapshot S2, the computer system 102 can determine that the snapshot S2 includes the following region values: region 0 has the value stored in storage location P0 (Data0); region 1 has the value stored in storage location P3 (Data3); region 2 has the value stored in storage location P5 (Data5); and region 4 has the value stored in storage location P4 (Data4). Comparing these values (e.g., performing a diff operation) to the current data values stored in the virtual storage device 106, as indicated by the table 114, the computer system 102 can identify that the value of region 0 has been modified since the previous snapshot S2.

A unique identifier for the requested snapshot is generated (406). For example, a running counter of snapshots for a virtual storage device can be used to identify a next unique identifier for the requested snapshot. For instance, referring to FIG. 1, the snapshots S0-S3 can each be associated with different unique numbers, such as numbers in a sequence of incremented/decremented integers. In another example, timestamps (e.g., UNIX epoch timestamp) for times at which snapshots were created can be generated and used as a unique identifier for the snapshot.

The requested snapshot is created using the identified regions of the virtual storage device and the generated unique identifier (408). For example, the snapshot generator 212 can create and store snapshots in the persistent storage 220 using information that identifies regions of the virtual storage devices 242 that have been modified since previous snapshots were created and information that uniquely identifies the snapshots. For instance, referring to FIG. 1, the computer system 102 can create an entry for the snapshot S3 in the snapshot repository 104 using, at least, a unique identifier for the snapshot S3 (e.g., an incremented snapshot number, a timestamp) and information that identifies the recently modified regions of the virtual storage device 106 (region 0 of the virtual storage device 106) and a data value for the recently modified regions (information identifying storage location P6 from the underlying storage system 108).

In some implementations, a subsequent request is received to write new data to a first region of the virtual storage device, where the first region is one of the identified regions that are included in the created snapshot (410). For example, after creating the snapshot S0 the computer system 102 can receive a request to write Data3 to region 1 of the virtual storage device 106. The snapshot S0 is depicted as including data stored at P1 (Data1) of the underlying storage system 108 as having been written to region 1 of the virtual storage device 106. Instead of overwriting a first storage location (e.g., a physical storage location of an underlying storage device) that is used to store a data value for the first region in the created snapshot, a second storage location is allocated to store the new data (412). For example, instead of overwriting the storage location P1 of the underlying storage system 108 with the requested data (Data3), the computer system 102 allocates a new storage location P3 from the underlying storage system 108 to store the requested data. The second storage location can be different and separate from the first storage location. For example, the newly allocated storage location P3 is different and separate from the storage location P1 that is storing the original contents of region 1 of the virtual storage device 106. The new data is written to the second storage location (414). For example, as indicated in the table 112, the new data (Data3) is written to the newly allocated storage location P3 in the underlying storage system 108. The old data for the first region stored in the first storage location and the new data stored in the second storage location can be persistently and concurrently maintained by an underlying storage system. For example, the table 112 indicates that the original and rewritten data for region 1 of the virtual storage device 106, Data1, is still stored at location P1 of the underlying storage system 108 after the region 1 of the virtual storage device 106 has been rewritten with the new data, Data3, which is concurrently stored at location P3 of the underlying storage system 108.

In some implementations, a subsequent request is received to access the created snapshot (416). For example, the computer system 102 can receive a request from a client computing device (e.g., a desktop computer, laptop computer, smartphone) to access the snapshot S2 of the virtual storage device 106. In response to receiving the subsequent request, the regions that are identified in the snapshot can be retrieved (418). For example, the computer system 102 can access the snapshot S2 from the snapshot repository 104 and can use the information included in the snapshot S2 (e.g., information that correlates region 2 of the virtual storage device 106 with the with location P5 of the underlying storage system 108) to access data values Data5 for region 2 of the virtual storage device 106 at snapshot S2. Using reverse chronological order, other snapshots can analyzed to identify and retrieve the most recent versions of the other regions of the virtual storage device that are not included in the snapshot (420). For example, the computer system 102 can work backward in time from snapshot S2 to identify the most recent data values for other regions for which data values have not yet been retrieved. Moving first to snapshot S1, the computer system 102 can access the snapshot S1 from the snapshot repository 104 and can use the information included in the snapshot S1 (e.g., information that correlates regions 1 and 3 of the virtual storage device 106 with the with locations P3 and P4, respectively, of the underlying storage system 108) to access data values Data3 for region 1 and Data4 for region 3 of the virtual storage device 106. Moving next to snapshot S0, the computer system 102 can access the snapshot S1 from the snapshot repository 104 and, using the stored information for the snapshot S1, can access a data value Data0 for region 0 from storage location P0 of the underlying storage system 108. Data for the other two regions included in the snapshot S0, region 1 and region 2, may not be retrieved by the computer system 102 based data already having been retrieved for these regions with regard to more recent snapshots (snapshots S2 and S1). Access to the snapshot can be provided using the identified regions from the snapshot and the most recent versions of the other regions (422). For example, the computer system 102 can provide at least a portion of the recreated snapshot S2 for the virtual storage device 106 to a client device that has requested access to the snapshot.

In some implementations, a subsequent request is received to delete a previous snapshot (424). For example, the computer system 102 can receive a request from a client computing device to delete the snapshot S1 of the virtual storage device 106. In response to receiving the subsequent request, a determination can be made as to whether any other snapshots that occur chronologically after the previous snapshot use region information that is specified in the previous snapshot (426). For example, the computer system 102 can determine whether snapshots S2 or S3 (snapshots occurring chronologically after the snapshot S1) rely on data values that are contained in the snapshot S1 that is requested for deletion. In this example, the snapshot S2 uses data values for regions 1 and 3 from the snapshot S1, and the snapshot S3 uses the same data values for regions 1 and 3 from the snapshot S1. If any of the other snapshots use portions of the previous snapshot, then the previous snapshot can be marked for deletion at a later time when portions of the previous snapshot are not being used by other snapshots that occur chronologically after the previous snapshot (428). For example, the computer system 102 can mark the snapshot S1 for deletion at a later date when the other snapshots (e.g., S2, S3) are no longer using portions of data included in the snapshot S1.

Figure 5:
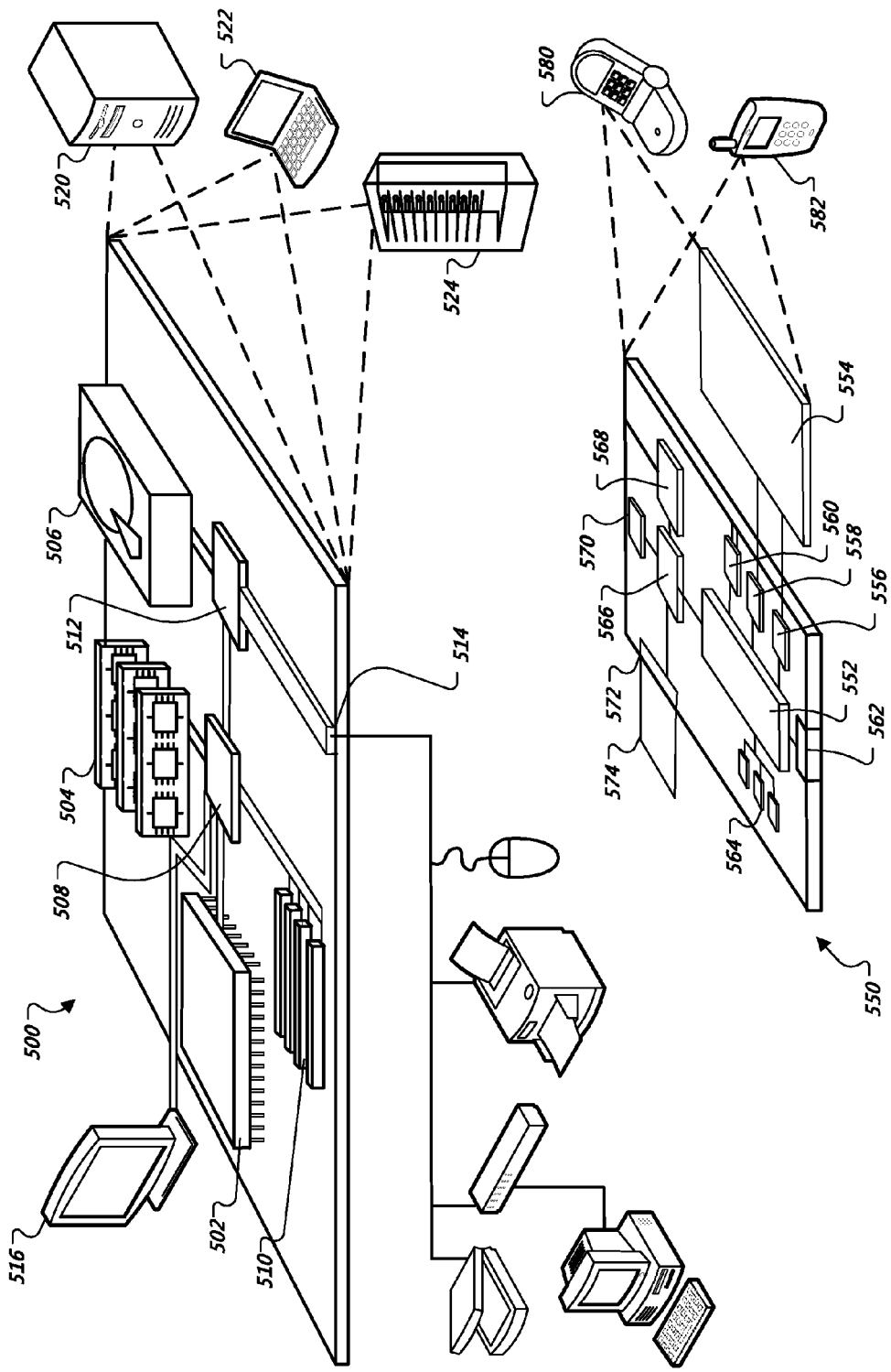
FIG. 5 is a block diagram of example computing devices.

FIG. 5 is a block diagram of example computing devices 500, 550 that may be used to implement the systems and methods described in this document, as either a client or as a server or plurality of servers. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. Additionally computing device 500 or 550 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chip set of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT (Thin-Film-Transistor Liquid Crystal Display) display or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552 that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
   receiving, at a computer system, a request to create a snapshot of a virtual storage device, wherein the virtual storage device virtually stores data at virtual addresses, the data being physically stored at a plurality of physical storage locations that are managed by an underlying storage system associated with virtual storage device;
   identifying, by the computer system, one or more regions of the virtual storage device that have been written to since a previous snapshot of the virtual storage device was created, wherein data written to the one or more identified regions is stored in the plurality of physical storage locations;
   generating a unique identifier for the requested snapshot; and
   creating the requested snapshot using the identified one more regions and the unique identifier, wherein the requested snapshot includes a mapping of the unique identifier to the one or more identified regions of the virtual storage device.

2. The method of claim 1, wherein the unique identifier includes a running counter of snapshots to identify a next unique identifier for the request snapshot.

3. The method of claim 2, wherein the unique identifier includes a timestamp.

4. The method of claim 1, further comprising:
   receiving a request to write new data to a first region of the virtual storage device, wherein the first region is indicated in the previous snapshot as storing previous data at a first physical storage location of the underlying storage system;
   allocating a second physical storage location of the underlying storage system to store the new data in association with the first region of the virtual storage device; and
   writing the new data to the second physical storage location.

5. The method of claim 4, wherein the request to write the new data to the first region is received before the request to create the snapshot and after the previous snapshot of the virtual storage device was created, and wherein the one or more identified regions includes the first region.

6. The method of claim 1, further comprising:
   after creating the snapshot, receiving a request to access the created snapshot of the virtual storage device;
   retrieving the one or more identified regions using the mapping for the created snapshot;
   identifying and retrieving most recent versions of other regions of the virtual storage device that are not included in the mapping of the created snapshot, wherein the most recent versions of the other regions are identified using other snapshots of the virtual storage device; and
   providing access to the created snapshot using the retrieved one or more identified regions and the most recent versions of the other regions of the virtual storage device.

7. The method of claim 1, further comprising:
   receiving a request to delete the previous snapshot of the virtual storage device;
   determining whether the previous snapshot includes at least one other region of the virtual storage device that is not included in the mapping; and
   when the previous snapshot is determined to include the at least one other region, marking the previous snapshot for deletion at a later time when a new snapshot includes the at least one region.

8. A system comprising:
   one or more computers;
   a memory storage system in data communication with the one or more computers and storing instructions executable by the one or more computers that upon such execution cause the one or more computers to perform operations comprising:
   receiving a request to create a snapshot of a virtual storage device, wherein the virtual storage device virtually stores data at virtual addresses, the data being physically stored at a plurality of physical storage locations that are managed by an underlying storage system associated with virtual storage device;
   identifying one or more regions of the virtual storage device that have been written to since a previous snapshot of the virtual storage device was created, wherein data written to the one or more identified regions is stored in the plurality of physical storage locations;
   generating a unique identifier for the requested snapshot; and
   creating the requested snapshot using the identified one more regions and the unique identifier, wherein the requested snapshot includes a mapping of the unique identifier to the one or more identified regions of the virtual storage device.

9. The system of claim 8, wherein the unique identifier includes a running counter of snapshots to identify a next unique identifier for the request snapshot.

10. The system of claim 9, wherein the unique identifier includes a timestamp.

11. The system of claim 8, the operations further comprising:
    receiving a request to write new data to a first region of the virtual storage device, wherein the first region is indicated in the previous snapshot as storing previous data at a first physical storage location of the underlying storage system;
    allocating a second physical storage location of the underlying storage system to store the new data in association with the first region of the virtual storage device; and
    writing the new data to the second physical storage location.

12. The system of claim 8, wherein the request to write the new data to the first region is received before the request to create the snapshot and after the previous snapshot of the virtual storage device was created, and wherein the one or more identified regions includes the first region.

13. The system of claim 8, the operations further comprising:
   after creating the snapshot, receiving a request to access the created snapshot of the virtual storage device;
   retrieving the one or more identified regions using the mapping for the created snapshot;
   identifying and retrieving most recent versions of other regions of the virtual storage device that are not included in the mapping of the created snapshot, wherein the most recent versions of the other regions are identified using other snapshots of the virtual storage device; and
   providing access to the created snapshot using the retrieved one or more identified regions and the most recent versions of the other regions of the virtual storage device.

14. The system of claim 8, the operations further comprising:
   receiving a request to delete the previous snapshot of the virtual storage device;
   determining whether the previous snapshot includes at least one other region of the virtual storage device that is not included in the mapping; and
   when the previous snapshot is determined to include the at least one other region, marking the previous snapshot for deletion at a later time when a new snapshot includes the at least one region.

15. A computer program product tangibly embodied on a computer readable medium, the computer program product including instructions that, when executed, cause a computing device to perform operations comprising:
   receiving a request to create a snapshot of a virtual storage device, wherein the virtual storage device virtually stores data at virtual addresses, the data being physically stored at a plurality of physical storage locations that are managed by an underlying storage system associated with virtual storage device;
   identifying one or more regions of the virtual storage device that have been written to since a previous snapshot of the virtual storage device was created, wherein data written to the one or more identified regions is stored in the plurality of physical storage locations;
   generating a unique identifier for the requested snapshot; and
   creating the requested snapshot using the identified one more regions and the unique identifier, wherein the requested snapshot includes a mapping of the unique identifier to the one or more identified regions of the virtual storage device.

* * * * *